(12) United States Patent
Yokono

(10) Patent No.: US 7,801,354 B2
(45) Date of Patent: Sep. 21, 2010

(54) IMAGE PROCESSING SYSTEM

(75) Inventor: Jun Yokono, Tokyo (JP)

(73) Assignee: Sony Corporation, Tokyo (JP)

( * ) Notice: Subject to any disclaimer, the term of this patent is extended or adjusted under 35 U.S.C. 154(b) by 995 days.

(21) Appl. No.: 11/589,872

(22) Filed: Oct. 31, 2006

(65) Prior Publication Data

US 2007/0098255 A1 May 3, 2007

(30) Foreign Application Priority Data

Nov. 2, 2005 (JP) .............................. 2005-319018

(51) Int. Cl.
*G06K 9/62* (2006.01)
(52) U.S. Cl. ................................... 382/159
(58) Field of Classification Search ......... 382/156–161, 382/181, 209, 190
See application file for complete search history.

(56) References Cited

U.S. PATENT DOCUMENTS 7,054,850 B2 * 5/2006 Matsugu ..................... 706/48
7,120,292 B2 * 10/2006 Kunii et al. ................. 382/159

* cited by examiner

*Primary Examiner*—Daniel G Mariam
(74) *Attorney, Agent, or Firm*—Finnegan, Henderson, Farabow, Garrett & Dunner, L.L.P.

(57) ABSTRACT

An image processing system includes a learning device generating, in advance, a recognizer for recognizing a recognition target; and a recognition device recognizing, using the recognizer, whether a recognition image includes the recognition target. The learning device includes model feature point generator for generating model feature points, model feature quantity generator for generating model-feature quantities, learning feature point generator for generating learning feature points, learning feature quantity generator for generating learning feature quantities, learning correlation feature quantity generator for generating a learning correlation feature quantity, and recognizer generator for generating the recognizer. The recognition device includes recognition feature point generator for generating recognition feature points, recognition feature quantity generator for generating recognition feature quantities, recognition correlation feature quantity generator for generating a recognition correlation feature quantity, and recognition processor for determining whether the recognition image includes the recognition target.

15 Claims, 10 Drawing Sheets

|  |  | k=1 | k=2 | k=3 |  | k=N |
|---|---|---|---|---|---|---|
|  |  | $G_{r1}$ | $G_{r2}$ | $G_{r3}$ |  | $G_{rN}$ |
| (+1) | $PI_1$ | ( $A_1$ , | $A_2$ , | $A_3$ , | ... | $A_N$ ) |
| (+1) | $PI_2$ | ( $B_1$ , | $B_2$ , | $B_3$ , | ... | $B_N$ ) |
| (−1) | $PI_3$ | ( $C_1$ , | $C_2$ , | $C_3$ , | ... | $C_N$ ) |
| ⋮ | ⋮ | ⋮ | ⋮ | ⋮ | | ⋮ |
| (−1) | $PI_M$ | ( $M_1$ , | $M_2$ , | $M_3$ , | ... | $M_N$ ) |
|  |  | ↓ | ↓ | ↓ |  | ↓ |
|  |  | $e_{j1}$ | $e_{j2}$ | $e_{j3}$ |  | $e_{jN}$ |

IMAGE PROCESSING SYSTEM

CROSS REFERENCES TO RELATED APPLICATIONS

The present invention contains subject matter related to Japanese Patent Application JP 2005-319018 filed in the Japanese Patent Office on Nov. 2, 2005, the entire contents of which are incorporated herein by reference.

BACKGROUND OF THE INVENTION

1. Field of the Invention

The present invention relates to image processing systems, and more particularly, to a learning device that generates a recognizer for recognizing a recognition target, a recognition device that recognizes, using the recognizer, whether or not a recognition image includes the recognition target, a processing method performed by the learning device and the recognition device, and a program for causing a computer to execute the processing method.

2. Description of the Related Art

In recent years, various object recognition methods based on image processing have been suggested. In particular, such methods have been dramatically improved over the past ten years. Nowadays, a technology for dividing the entire image into a plurality of small regions called local regions and for performing object recognition in accordance with local information, such as feature points and feature quantities, acquired from the local regions is becoming mainstream. The term "local region" is also called a "local descriptor", a "component", a "part", a "fragment", or the like.

As a method for realizing object recognition in accordance with such local information, an elastic bunch graph matching (EBGM) method has been suggested (see, for example, Martin Lades, Jan C. Vorbruggen, Joachim M. Buhmann, Jorg Lange, Christoph von der Malsburg, Rolf P. Wurtz, Wolfgang Konen: "Distortion Invariant Object Recognition in the Dynamic Link Architecture", IEEE Trans. on Computers, Vol. 42, No. 3, pp. 300-311, 1993). In the EBGM method, Gabor jets are used as local information. Gabor jets in which a vector representing responses to various directions and frequencies is regarded as a feature quantity are acquired as output of direction-selective cells (oriented filters), which are said to exist in the primary visual cortex of the human brain. In the EBGM method, feature quantities at individual feature points provided by users are gathered as Gabor jets, and matching is performed using a predetermined evaluation function. As an evaluation function, a distance with respect to a point exhibiting the highest correlation in the vicinity of a feature point and the correlation value are used.

Such an idea in which the highest correlation in the vicinity of a feature point is used as a feature quantity is also adopted in an HMAX (Hierarchical Model and X) model (see, for example, Riesenhuber, M. and T. Poggio: "Hierarchical Models of Object Recognition in Cortex", Nature Neuroscience, 2, pp. 1019-1025, 1999). The HMAX model is an object recognition method in which the visual processing system of human beings is modeled, and both the scale direction and the space direction are searched to acquire, as a feature quantity, a neuron value exhibiting the largest response. In the HMAX model, recognition is performed independent of position. Thus, the HMAX model is capable of flexibly handling pattern deviation and displacement.

However, in the above-mentioned known technologies, the contents of feature quantities acquired as local information differ depending on the type of feature quantity, and mutual compatibility between different types of feature quantities is not ensured. For example, since, normally, the dimension and scale of a vector of a feature quantity for color is different from the dimension and scale of a vector of a feature quantity for shape, these feature quantities are not compared with each other. Thus, it is difficult to utilize different types of feature quantities in order to recognize an object.

SUMMARY OF THE INVENTION

It is desirable to realize an object recognition method utilizing different types of feature quantities.

An image processing system according to a first embodiment of the present invention includes a learning device that generates, in advance, a recognizer for recognizing a recognition target; and a recognition device that recognizes, using the recognizer, whether or not a recognition image includes the recognition target. The learning device includes model feature point generating means for generating a plurality of feature points as model feature points from a model image including the recognition target, model feature quantity generating means for generating feature quantities as model feature quantities at the model feature points, learning feature point generating means for generating a plurality of feature points as learning feature points from a learning image that includes the recognition target or that does not include the recognition target, learning feature quantity generating means for generating feature quantities as learning feature quantities at the learning feature points, learning correlation feature quantity generating means for selecting a learning feature quantity that exhibits the highest correlation with respect to each of the model feature quantities and for generating the level of correlation with respect to the selected learning feature quantity as a learning correlation feature quantity, and recognizer generating means for generating the recognizer in accordance with the learning correlation feature quantity and presence/absence information indicating whether or not the learning image includes the recognition target. The recognition device includes recognition feature point generating means for generating a plurality of feature points as recognition feature points from the recognition image, recognition feature quantity generating means for generating feature quantities as recognition feature quantities at the recognition feature points, recognition correlation feature quantity generating means for selecting a recognition feature quantity that exhibits the highest correlation with respect to each of the model feature quantities and for generating the level of correlation with respect to the selected recognition feature quantity as a recognition correlation feature quantity, and recognition processing means for determining whether or not the recognition image includes the recognition target by substituting the recognition correlation feature quantity into the recognizer. Thus, learning of a recognizer is performed by converting learning feature quantities into learning correlation feature quantities, and recognition processing is performed by converting recognition feature quantities into recognition correlation feature quantities. Thus, feature quantities of different types can be compared with each other under the same scale in order to determine whether or not a recognition target exists.

A learning device according to a second embodiment of the present invention includes model feature point generating means for generating a plurality of feature points as model feature points from a model image including a recognition target; model feature quantity generating means for generating feature quantities as model feature quantities at the model feature points; learning feature point generating means for generating a plurality of feature points as learning feature points from a learning image that includes the recognition target or that does not include the recognition target; learning feature quantity generating means for generating feature quantities as learning feature quantities at the learning feature points; learning correlation feature quantity generating means for selecting a learning feature quantity that exhibits the highest correlation with respect to each of the model feature quantities and for generating the level of correlation with respect to the selected learning feature quantity as a learning correlation feature quantity; and recognizer generating means for generating a recognizer in accordance with the learning correlation feature quantity and presence/absence information indicating whether or not the learning image includes the recognition target. Thus, learning of a recognizer is performed by converting learning feature quantities into learning correlation feature quantities. Thus, feature quantities of different types can be handled under the same scale, and statistical learning can be performed.

According to the second embodiment, the model feature points and the learning feature points may be selected in accordance with types of feature quantities at the corresponding feature points. Thus, a feature point appropriate for the type of feature quantity can be used. The model feature points and the learning feature points may be provided, for example, at corners or within a region in the recognition target.

According to the second embodiment, the model feature quantities and the learning feature quantities may be selected in accordance with types of feature quantities. Thus, a feature quantity appropriate for the type of feature quantity can be used. The model feature quantities and the learning feature quantities may be acquired, for example, by second-order differentiation or distribution of color at the model feature points and the learning feature points.

According to the second embodiment, the recognizer generating means may provide a threshold value for the learning correlation feature quantity to perform screening of the learning correlation feature quantity on the basis of the threshold value. Thus, a learning correlation feature quantity suitable for recognition can be used for a recognizer. The recognizer generating means may generate the recognizer and may perform screening of the learning correlation feature quantity in accordance with a boosting algorithm. The boosting algorithm is based on weighted voting. For example, a discrete AdaBoost algorithm, a gentle AdaBoost algorithm, or the like may be used.

A recognition device according to a third embodiment of the present invention includes recognition feature point generating means for generating a plurality of feature points as recognition feature points from an input recognition image; recognition feature quantity generating means for generating feature quantities as recognition feature quantities at the recognition feature points; recognition correlation feature quantity generating means for selecting a recognition feature quantity that exhibits the highest correlation with respect to each of model feature quantities at model feature points generated from a model image including a recognition target and for generating the level of correlation with respect to the selected recognition feature quantity as a recognition correlation feature quantity; and recognition processing means for determining whether or not the recognition image includes the recognition target by substituting the recognition correlation feature quantity into a recognizer generated in accordance with presence/absence information indicating whether or not a learning image that includes the recognition target or that does not include the recognition target includes the recognition target and a learning correlation feature quantity indicating the level of correlation between each of the model feature quantities and a learning feature quantity that exhibits the highest correlation with respect to the corresponding model feature quantity. Thus, recognition feature quantities are converted into recognition correlation feature quantities, and recognition processing is performed using a recognizer that performs statistical learning in accordance with learning correlation feature quantities. Thus, feature quantities of different types can be compared with each other under the same scale in order to determine whether or not a recognition target exists.

A learning method or a program according to a fourth embodiment of the present invention causes a computer to execute processing including the steps of generating a plurality of feature points as model feature points from a model image including a recognition target; generating feature quantities as model feature quantities at the model feature points; generating a plurality of feature points as learning feature points from a learning image that includes the recognition target or that does not include the recognition target; generating feature quantities as learning feature quantities at the learning feature points; selecting a learning feature quantity that exhibits the highest correlation with respect to each of the model feature quantities and generating the level of correlation with respect to the selected learning feature quantity as a learning correlation feature quantity; and generating a recognizer in accordance with the learning correlation feature quantity and presence/absence information indicating whether or not the learning image includes the recognition target. Thus, learning of a recognizer is performed by converting learning feature quantities into learning correlation feature quantities. Thus, feature quantities of different types can be handled under the same scale, and statistical learning can be performed.

Accordingly, an object recognition method using feature quantities of different types can be realized.

DESCRIPTION OF THE PREFERRED EMBODIMENTS

Embodiments of the present invention will be described with reference to the drawings.

Figure 1:
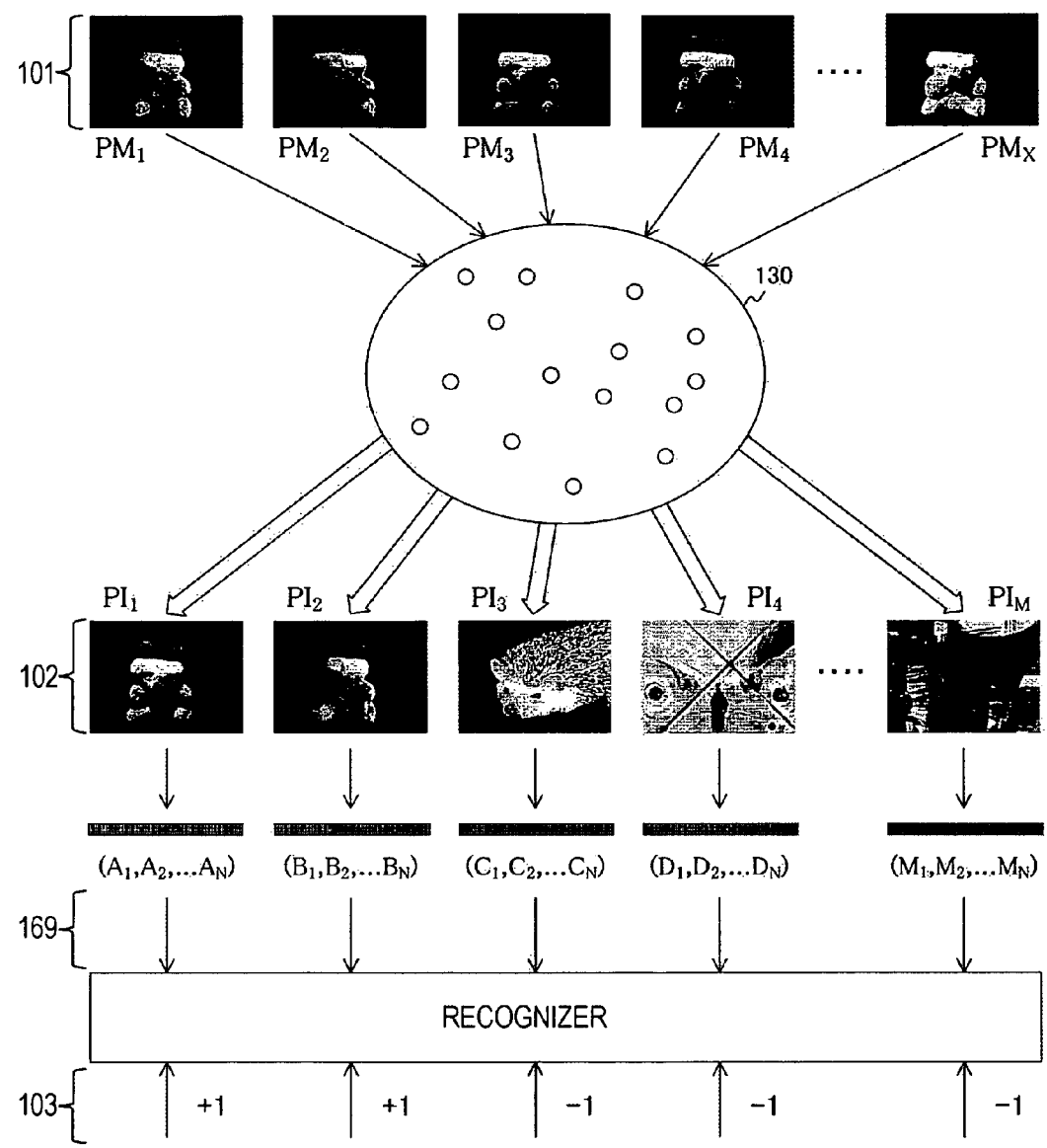
FIG. 1 shows the outline of a learning phase in an image processing system according to an embodiment of the present invention.

FIG. 1 shows the outline of a learning phase in an image processing system according to an embodiment of the present invention. Feature quantities (model feature quantities) at N (N is an integer of two or more) feature points (model feature points) generated from X (X is an integer of two or more) model images 101 ($PM_1$ to $PM_X$) are stored in a model feature quantity storage unit (feature quantity pool) 130. Each of the model images 101 includes a recognition target. That is, the feature quantities at feature points of all the images each including the recognition target are stored in the model feature quantity storage unit 130. In this example, a stuffed toy bear with a cap on is included as a recognition target.

In contrast, some of M (M is an integer of two or more) learning images 102 ($PI_1$ to $PI_M$) include the recognition target, and some of the M learning images 102 do not include the recognition target. Presence/absence information 103 indicates whether or not the recognition target is included. In this example, the presence/absence information 103 indicates "+1" when the recognition target is included, and the presence/absence information 103 indicates "−1" when the recognition target is not included. That is, as the learning images 102, the feature quantities at feature points in all the images including the recognition target and the feature quantities at feature points in all the images not including the recognition target are supplied together with the presence/absence information 103 indicating whether or not the recognition target is included.

The correlation values between the feature quantities (learning feature quantities) of a plurality of feature points (learning feature points) generated for each of the M learning images 102 and the N model feature quantities stored in the model feature quantity storage unit 130 are generated, and learning feature quantities each having the highest correlation value with respect to the corresponding one of the N model feature quantities are selected. The N correlation values generated at that time are acquired as correlation feature quantities. The correlation feature quantities are generated for the respective M learning images 102, and M learning correlation feature quantities 169 are acquired.

Learning of a recognizer is performed in accordance with the learning correlation feature quantities 169 acquired as described above and the presence/absence information 103. In a recognition phase, which is in the subsequent stage of the learning phase, the recognizer is used to determine whether or not an input recognition image includes a recognition target.

Figure 2:
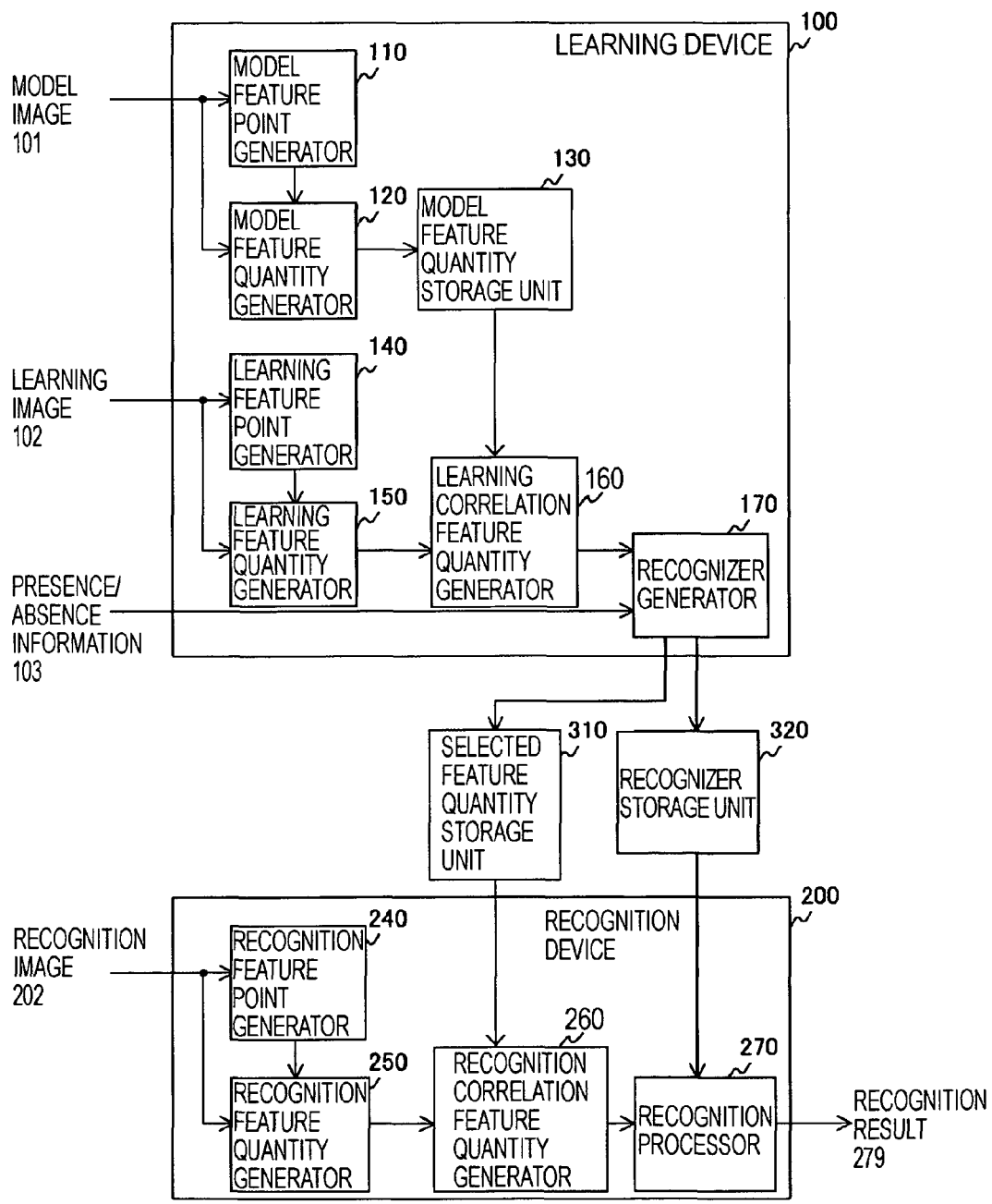
FIG. 2 shows an example of the configuration of the image processing system according to the embodiment.

FIG. 2 shows an example of the configuration of the image processing system according to the embodiment of the present invention. The image processing system includes a learning device 100 used in the learning phase and a recognition device 200 used in the recognition phase. The image processing system also includes a selected feature quantity storage unit 310 and a recognizer storage unit 320 that are disposed between the learning device 100 and the recognition device 200.

The learning device 100 includes a model feature point generator 110, a model feature quantity generator 120, a model feature quantity storage unit 130, a learning feature point generator 140, a learning feature quantity generator 150, a learning correlation feature quantity generator 160, and a recognizer generator 170.

The model feature point generator 110 generates model feature points from the model images 101. The model feature quantity generator 120 generates model feature quantities at the model feature points generated by the model feature point generator 110. The model feature quantity storage unit 130 stores the model feature quantities at the model feature points generated by the model feature quantity generator 120.

The learning feature point generator 140 generates learning feature points from the learning images 102. The learning feature quantity generator 150 generates learning feature quantities at the learning feature points generated by the learning feature point generator 140.

The learning correlation feature quantity generator 160 acquires correlation values between the model feature quantities and the learning feature quantities to generate the learning correlation feature quantities 169. The recognizer generator 170 performs statistical learning of the recognizer in accordance with the learning correlation feature quantities 169 generated by the learning correlation feature quantity generator 160 and the presence/absence information 103, stores into the selected feature quantity storage unit 310 model feature quantities selected in the process of statistical learning, and stores the recognizer into the recognizer storage unit 320.

The recognition device 200 includes a recognition feature point generator 240, a recognition feature quantity generator 250, a recognition correlation feature quantity generator 260, and a recognition processor 270.

The recognition feature point generator 240 generates feature points (recognition feature points) from recognition images 202. The recognition feature quantity generator 250 generates feature quantities (recognition feature quantities) at the recognition feature points generated by the recognition feature point generator 240.

The recognition correlation feature quantity generator 260 acquires correlation values between the model feature quantities stored in the selected feature quantity storage unit 310 and the recognition feature quantities to generate recognition correlation feature quantities. The recognition processor 270 recognizes whether or not each of the recognition images 202 includes a recognition target by substituting the recognition correlation feature quantities generated by the recognition correlation feature quantity generator 260 into the recognizer stored in the recognizer storage unit 320, and outputs the result as a recognition result 279.

Any of local feature quantities (local features) and global feature quantities (global features) may be adopted as feature quantities used in the image processing system, and various types, such as shape, color, motion, texture, material, and walking pattern, can be defined. For example, as a local feature quantity for shape, brightness information on a partial region may be used. Alternatively, brightness information subjected to conversion by a Laplacian (second-order differentiation), a Gaussian derivative function, a steerable filter, a Gabor filter, scale-invariant feature transform (SIFT), or the like may be adopted. In addition, as a local feature quantity for color, color information (RGB, HSV, or the like) on a partial region may be used. Alternatively, information processed as a histogram may be adopted. In addition, as a local feature quantity for motion, a motion vector (optical flow) may be adopted.

In addition, any point in an image can be used as a feature point. Generally, however, an edge or a corner is used as a feature point. Such a feature point can be defined in accordance with the type of feature quantity. For example, for a feature quantity for shape, a feature is likely to appear at an edge or a corner. Thus, it is desirable that an edge or a corner be used as a feature point. In contrast, for a feature quantity for color, a feature is likely to appear inside a region of an object. Thus, it is desirable that, instead of a limited particular point, a random point be adopted as a feature point.

In order to acquire an edge or a corner as a feature point for shape, a Harris corner detector can be used. The Harris corner detector acquires a brightness gradient at each pixel point (x,y) of image data, and calculates a second moment matrix M in a local region, as represented by $$M = \begin{bmatrix} \left(\frac{\partial I}{\partial x}\right)^2 & \left(\frac{\partial I}{\partial x}\right)\left(\frac{\partial I}{\partial y}\right) \\ \left(\frac{\partial I}{\partial x}\right)\left(\frac{\partial I}{\partial y}\right) & \left(\frac{\partial I}{\partial x}\right)^2 \end{bmatrix}$$ [Equation 1]

Two eigenvalues of the second moment matrix M are represented by $\alpha$ and $\beta$. In this case, a corner is acquired if both the eigenvalues $\alpha$ and $\beta$ are larger than a predetermined threshold value, an edge is acquired if one of the eigenvalues $\alpha$ and $\beta$ is larger than the predetermined threshold value, and no point is acquired if both the eigenvalues $\alpha$ and $\beta$ are smaller than the predetermined threshold value. In order to perform such determination, a determinant det(M) of the second moment matrix M and a trace(M), which is the sum of diagonal components, are calculated, and the following corner response function CR is calculated:

$CR = det(M) - k(trace(M))^2$, where k is 0.04.

A corner is acquired if the corner response function CR is a positive number, and an edge is acquired if the corner-response function CR is a negative number. No point is acquired if the corner response function CR is smaller than a predetermined value. In accordance with such a procedure, a corner or an edge can be extracted.

Although the corner response function CR based on subtraction is used in order to determine a corner or an edge in the above-mentioned example, division may be used as follows:

$CR = det(M)/(k(trace(M))^2)$.

When a Laplacian is used as a feature quantity for shape, a Gaussian derivative function G can be obtained by second-order differentiation in an x-direction and a y-direction, as represented by Equation 2.

$$G = e^{-\frac{x^2+y^2}{2\sigma^2}}$$ [Equation 2]

First-order differentiation in each of the x-direction and the y-direction is acquired as follows:

$Gx = -(x/\sigma^2)G$ $Gy = -(y/\sigma^2)G$.

Second-order differentiation in each of the x-direction and the y-direction is acquired as follows:

$Gxx = (x^2/\sigma^4 - 1/\sigma^2)G$ $Gyy = (y^2/\sigma^4 - 1/\sigma^2)G$.

Thus, a Laplacian L is acquired by the following equation:

$L = Gxx + Gyy = ((x^2+y^2)/\sigma^4 - 2/\sigma^2)G$.

Figure 3A:
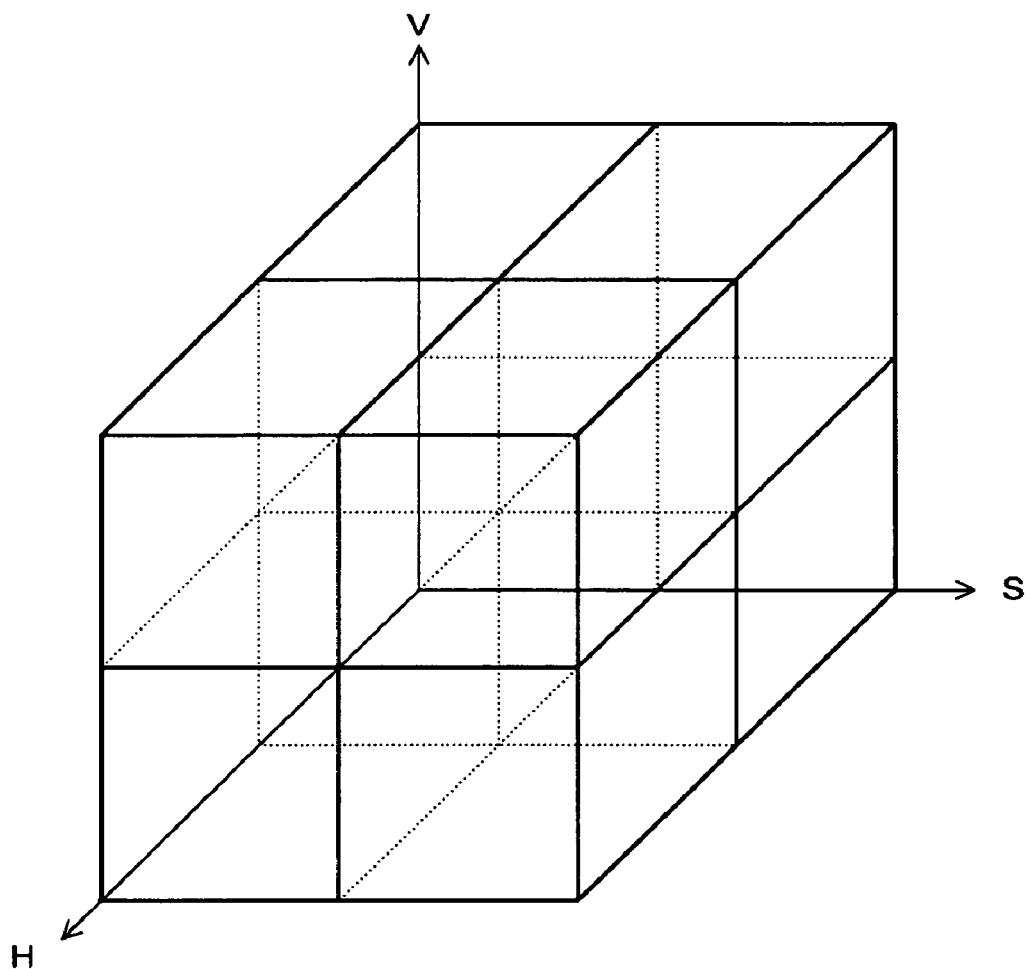
FIGS. 3A and 3B show an example of a histogram in an HSV space.
Figure 3B:
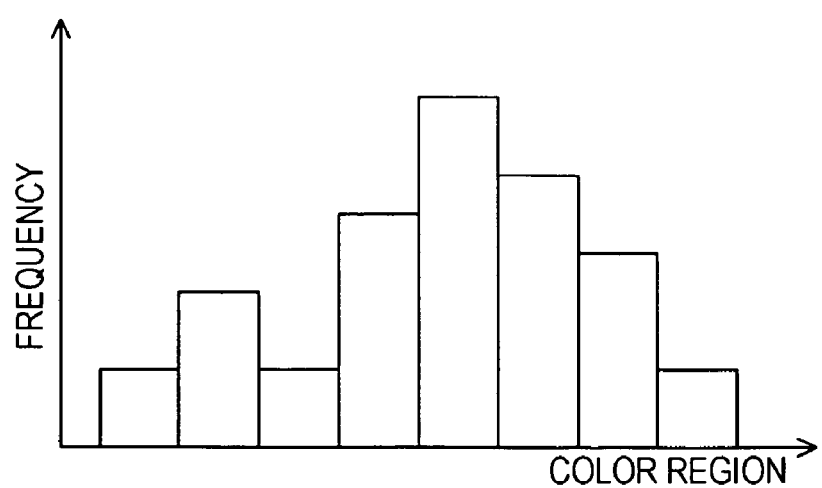

When a color histogram is used as a feature point for color, a color space is divided into predetermined color regions, and distribution in each color region is acquired. FIGS. 3A and 3B show an example of a histogram in an HSV space. In the HSV representation, H represents a hue, S represents saturation, and V represents luminance.

In the example shown in FIG. 3A, for the sake of easier explanation, each of HSV components is divided into two regions. Thus, 8 (=$2^3$) color regions are provided. FIG. 3B is a histogram representing the frequency of occurrence in the respective color regions based on color distribution in an image region including a portion (for example, about 10 pixels) adjacent to a certain feature point.

As described above, feature points and feature quantities are capable of providing appropriate definition in accordance with the type of feature quantity. The feature quantities acquired as described above are converted into correlation feature quantities by the learning correlation feature quantity generator 160 and the recognition correlation feature quantity generator 260. In the learning correlation feature quantity generator 160 and the recognition correlation feature quantity generator 260, correlation values between learning feature quantities and model feature quantities and correlation values between recognition feature quantities and model feature quantities are acquired so that various feature quantities are compared with each other in the same dimension and are used for learning of a recognizer.

In general, a correlation value C between two vectors $v_1$ and $v_2$ representing feature quantities is calculated by Equation 3, where an overbar over a vector represents the average of the vector.

$$C = \frac{(v_1 - \overline{v_1})(v_2 - \overline{v_2})}{\sqrt{(v_1 - \overline{v_1})^2 (v_2 - \overline{v_2})^2}}$$ [Equation 3]

The correlation value C represents a value within a range from 0.0 to 1.0. A higher correlation is represented as a value closer to 1.0, and a lower correlation is represented as a value closer to 0.0.

In addition, when a correlation value is acquired, the elastic bunch graph matching (EBGM) method, which is described in the background of the invention, may be used. In the EBGM method, a point exhibiting the highest correlation (the maximum correlation point) in the vicinity of a feature point corresponding to a model feature quantity stored in the model feature quantity storage unit 130 is acquired, and the correlation value at the maximum correlation point is used as a correlation feature quantity.

Figure 4:
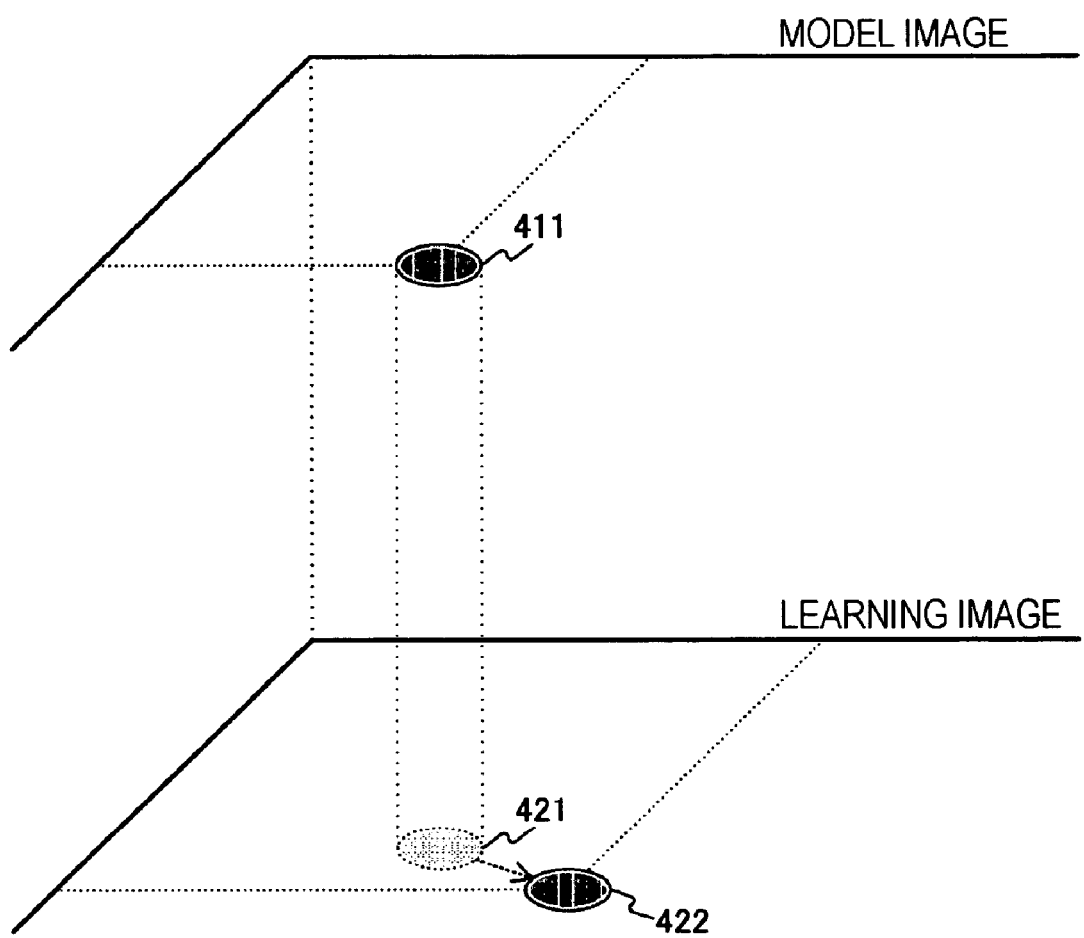
FIG. 4 shows an example of searching for the maximum correlation point in accordance with an EBGM method.

FIG. 4 shows an example of searching for the maximum correlation point in accordance with the EBGM method. When a feature point 411 is generated in a model image, a point 421 in a learning image corresponding to the feature point 411 is set. The learning correlation feature quantity generator 160 calculates the correlation value between the feature point 411 and each point in the vicinity of the point 421 in the learning image, and the maximum correlation point 422 is acquired. The correlation value at the maximum correlation point 422 serves as a learning correlation feature quantity.

As described above, when the EBGM method is used for acquiring a correlation feature quantity, the robustness with respect to deviation of an object or a change in a visual point can be achieved. Thus, more flexibility with respect to such disturbance can be achieved.

Although a case where the EBGM method is used by the learning correlation feature quantity generator 160 in order to acquire a learning correlation feature quantity has been described, the EBGM method may also be used by the recognition correlation feature quantity generator 260 in order to acquire a recognition correlation feature quantity.

Figure 5:
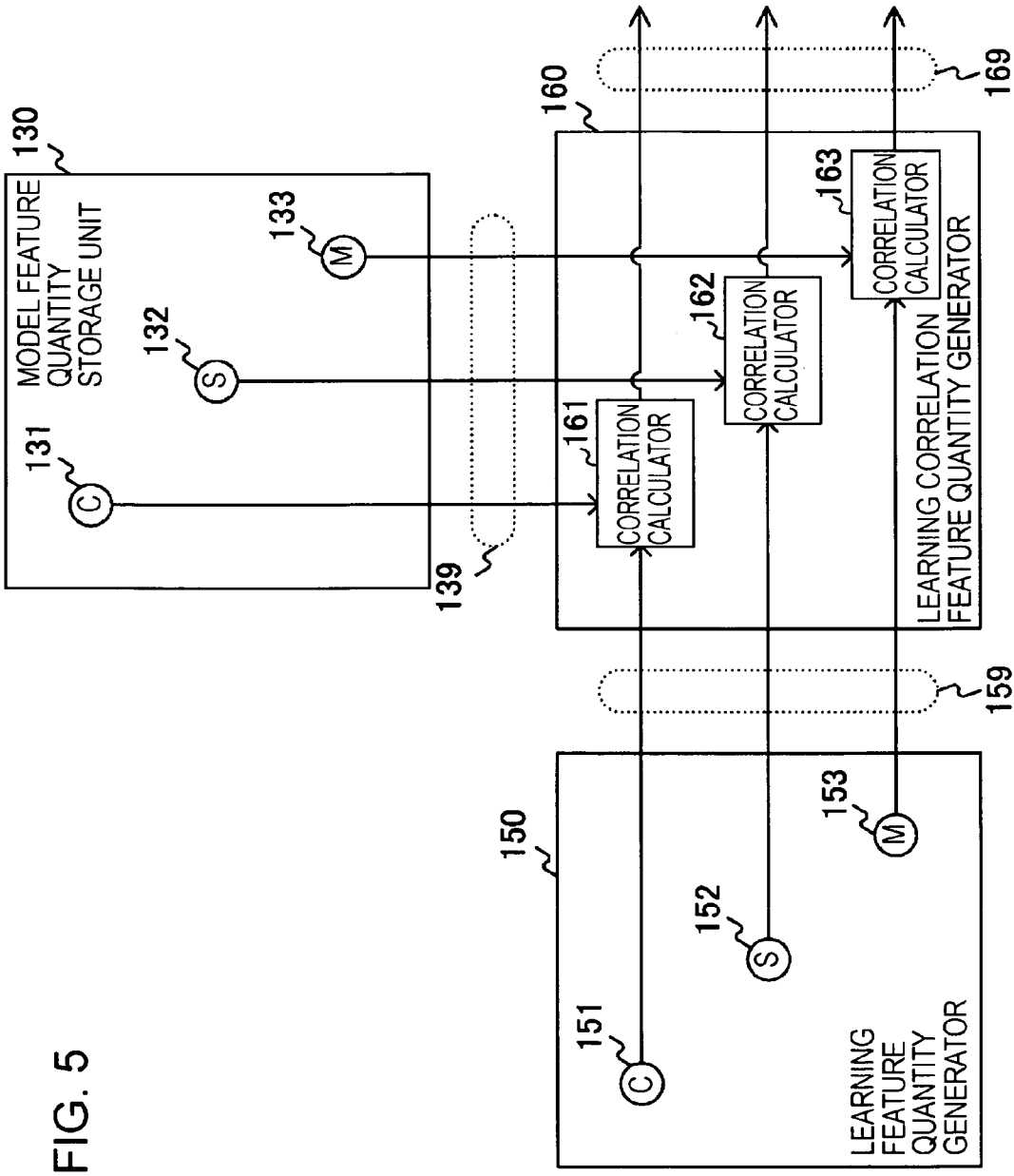
FIG. 5 shows the outline of an example of calculation of a correlation feature quantity in the embodiment.

FIG. 5 shows the outline of an example of calculation of a correlation feature quantity in this embodiment. In the example shown in FIG. 5, as types of model feature quantities 139 stored in the model feature quantity storage unit 130, a model feature quantity 131 for color, a model feature quantity 132 for shape, and a model feature quantity 133 for motion are assumed.

A correlation calculator 161 for color in the learning correlation feature quantity generator 160 calculates the correlation value between the model feature quantity 131 for color and a corresponding learning feature quantity 151 among a plurality of learning feature quantities 159. Similarly, a correlation calculator 162 for shape calculates the correlation value between the model feature quantity 132 for shape and a corresponding learning feature quantity 152. In addition, a correlation calculator 163 for motion calculates the correlation value between the model feature quantity 133 for motion and a corresponding learning feature quantity 153.

As described above, the correlation calculators 161 to 163 calculate correlation values for feature quantities of different types. Since the dimensions of vectors of the original feature quantities are different from each other depending on the type of feature quantity, it is difficult to compare the original feature-quantities. However, in this embodiment, feature quantities are normalized into correlation feature quantities indicating a value within a predetermined range (from 0.0 to 1.0) in accordance with the degree of correlation. Thus, even feature quantities of different types have compatibility. By performing learning of a recognizer using such a correlation feature quantity and performing recognition, object recognition based on statistical learning using various types of feature quantities can be realized.

Although the processing performed when the learning correlation feature quantity generator 160 converts a learning feature quantity into a learning correlation feature quantity has been described, processing performed when the recognition correlation feature quantity generator 260 converts a recognition feature quantity into recognition correlation feature quantity is performed in a similar manner.

Figures 6, 7:
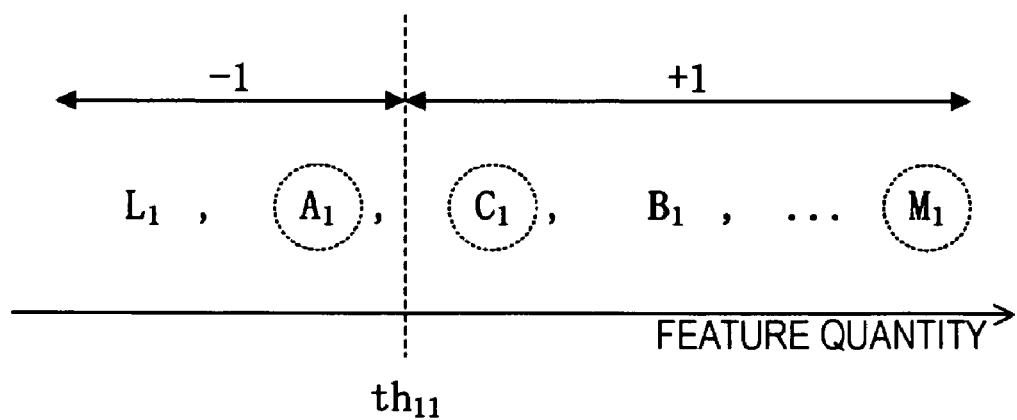
FIG. 6 shows the outline of an example of learning by a recognizer generator in the embodiment.
FIG. 7 shows an example of setting of a threshold value in the embodiment.

FIG. 6 shows the outline of an example of learning performed by the recognizer generator 170 in this embodiment. In the example shown in FIG. 6, the correlation feature quantities of the M learning images 102 ($PI_1$ to $PI_M$) are represented as N-dimensional vectors corresponding to the number N of feature points for model feature quantities stored in the model feature quantity storage unit 130. That is, correlation feature quantities of the first learning image $PI_1$ are represented as $A_1, A_2, \ldots,$ and $A_N$, and correlation feature quantities of the second learning image $PI_2$ are represented as $B_1, B_2, \ldots,$ and $B_N$, and correlation feature quantities of the third learning image $PI_3$ are represented as $C_1, C_2, \ldots,$ and $C_N$. Similarly, correlation feature quantities of the Mth learning image $PI_M$ are represented as $M_1, M_2, \ldots,$ and $M_N$.

If a group $Gr_k$ is assumed for a feature point k for model feature quantities, correlation feature quantities for a feature point k=1 are represented as $A_1, B_1, C_1, \ldots,$ and $M_1$, which are represented as a group $Gr_1$. Similarly, correlation feature quantities for a feature point k=2 are represented as $A_2, B_2, C_2, \ldots,$ and $M_2$, which are represented as a group $Gr_2$. Similarly, correlation feature quantities for a feature point k=N are represented as $A_N, B_N, C_N, \ldots,$ and $M_N$, which are represented as a group $Gr_N$. That is, M groups $Gr_k$ of correlation feature quantities are defined for feature points k in accordance with M learning images $PI_1$ to $PI_M$.

A value "+1" or "−1" provided at the left side of FIG. 6 represents the presence/absence information 103. The value "+1" or "−1" indicates whether or not the corresponding image 102 includes a recognition target.

For each feature point k, M correlation feature quantities are extracted at random in accordance with weight $w_i$ set for each learning image 102 ($PI_i$). In the initial processing, all the weights $w_i$ are equal to each other, and all the correlation feature quantities are selected in terms of probability by selection of M correlation feature quantities. Thus, in the initial processing, all the correlation feature quantities are selected for each feature point k. In the subsequent processing, the same correlation feature quantities may be selected redundantly.

For each of the N feature points k, correlation feature quantities are sorted in the ascending (or descending) order in advance in each group $Gr_k$. The error rate $e_{jk}$ of each group $Gr_k$ for a corresponding feature point k is calculated by the equation $e_{jk}=E_w[1(y \neq f_{jk}(x))]$ while changing a threshold value, and the threshold value is set so as to achieve the minimum error rate $e_{jk}$. Here, "j" represents a counter that counts the number of each of L (L is an integer of 1 or more) weak recognizers $f_{jk}(X)$ for a correlation feature quantity vector x at a feature point k. In addition, "j" represents an integer within a range from 1 to L.

In the above-mentioned equation, a teacher label y (that is, the presence/absence information 103) and the weak recognizer $f_{jk}(x)$ indicate "+1" or "−1" in accordance with the presence or absence of a recognition target. If both the teacher label y and the weak recognizer $f_{jk}(x)$ indicate the same value, estimation is realized. When estimation is not realized, accumulation of the number of error times is performed as "$E_w$".

FIG. 7 shows an example of setting of a threshold value in this embodiment. A threshold value $th_{jk}$ used when an error rate $e_{jk}$ is calculated is set such that feature quantities in a group $Gr_k$ are divided into two. In the example shown in FIG. 7, an example of setting of the threshold value $th_{11}$ at the first feature point k=1 when J is 1 is shown. When correlation feature quantities in a group $Gr_1$ are sorted in the ascending order, "$L_1, A_1, C_1, B_1, \ldots,$ and $M_1$" are acquired in the order from the smallest correlation feature quantity to the largest correlation feature quantity. Here, it is assumed that the threshold value $th_{11}$ is set between the correlation feature quantities $A_1$ and $C_1$, that a recognition target does not exist in a range in which a correlation feature quantity is smaller than the threshold value $th_{11}$, and that a recognition target exists in a range in which a correlation feature quantity is larger than the threshold value $th_{11}$. In the example shown in FIG. 7, learning images corresponding to the correlation feature quantities $A_1$ and $B_1$ include a recognition target, and the other learning images do not include a recognition target.

Even though the correlation feature quantity $A_1$ surrounded by a dotted line in FIG. 7 is a learning correlation feature quantity including a recognition target, the correlation feature quantity $A_1$ is smaller than the threshold value $th_{11}$. Thus, an error occurs in the correlation feature quantity $A_1$. In contrast, even though the correlation feature quantities $C_1$ and $M_1$ are learning correlation feature quantities not including a recognition target, the correlation feature quantities $C_1$ and $M_1$ are larger than the threshold value $th_{11}$. Thus, an error also occurs in each of the correlation feature quantities $C_1$ and $M_1$.

After error rates $e_{jk}$ are calculated as described above, the minimum weak recognizer $f_{jk}(x)$ is selected from among N error rates $e_{jk}$, and a confidence level $c_j$ is calculated in accordance with the selected error rate $e_{jk}$ by the following equation:

$$c_j = \log((1-e_{jk})/e_{jk}).$$

The weight $w_i$ (i is an integer indicating a range from 1 to N) of the learning image 102 is updated in accordance with the confidence level $c_j$ acquired as described above by the following equation:

$$w_i = w_i \cdot \exp[-c_j \cdot 1(y \neq f_{jk}(x))],$$

where further normalization is performed so that the sum of the weights $w_i$ is 1. Thus, the weight of a learning image including a correlation feature quantity in which an error occurs increases, and a learning image for which relearning is necessary can be clearly distinguished.

The selected weak recognizer $f_{jk}(x)$ is weighted using the confidence level $c_j$ as described above, and a recognizer $R(x)$ for a correlation feature quantity vector x is updated by the following equation:

$$R(x) = R(x) + c_j \times f_{jk}(x).$$

As a result, when $R(x)$ represents a positive number, the recognizer $R(x)$ indicates that a recognition target is included. In addition, when $R(x)$ represents a negative number, the recognizer $R(x)$ indicates that a recognition target is not included.

In addition, a model feature quantity at a feature point k exhibiting the minimum error rate $e_{jk}$ is selected, and the selected model feature quantity is stored in the selected feature quantity storage unit 310.

Learning processing for repeating weighting on a weak recognizer and adding the weighted weak recognizer by learning processing to generate a recognizer is a type of boosting (weighted voting) algorithm and is called a "discrete AdaBoost algorithm". In the learning processing, processing for calculating a recognizer and an error rate is repeated for each model feature quantity such that the weight of a learning feature quantity exhibiting a higher error rate sequentially increases and such that the weight of a learning feature quantity exhibiting a lower error rate decreases. Thus, in the process of repetition, a learning correlation feature quantity exhibiting a higher error rate is more likely to be selected when a recognizer is set. In addition, a learning correlation feature quantity that is difficult to recognize is more likely to be selected in accordance with an increase in the number of repetition, and learning is repeated. Thus, a correlation feature quantity of a learning image that is difficult to recognize is selected more often, and a high recognition rate can be finally achieved.

In addition, according to the boosting algorithm, a model feature quantity for a feature point k exhibiting the minimum error rate is selected from among N error rates $e_{jk}$, and the selected model feature quantity is stored in the selected feature quantity storage unit 310. Thus, learning of a recognizer and selection of a feature quantity can be performed at the same time. Therefore, in the recognition phase, a feature quantity appropriate for recognition can be used efficiently without using all the feature quantities stored in the model feature quantity storage unit 130.

The operation of the image processing system according to this embodiment will be described with reference to FIGS. 8 to 11.

Figure 8:
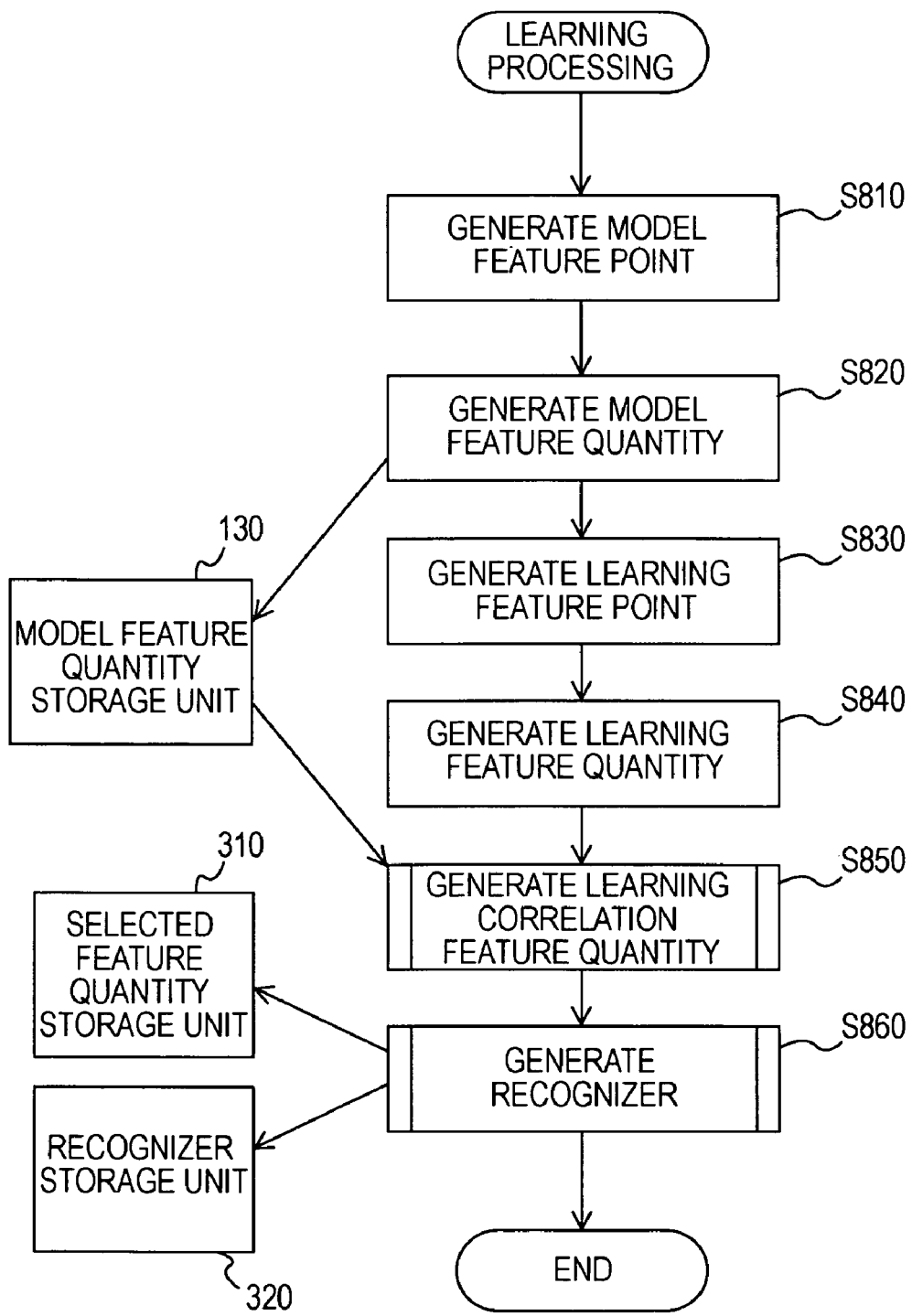
FIG. 8 is a flowchart showing an example of the process of learning processing in a learning phase in the embodiment.

FIG. 8 is a flowchart showing an example of the process of learning processing in the learning phase in this embodiment. The model feature point generator 110 generates N model feature points in X model images 101 (step S810). The model feature quantity generator 120 generates N model feature quantities at the model feature points (step S820). The generated model feature quantities are stored in the model feature quantity storage unit 130.

The learning feature point generator 140 generates learning feature points in each of M learning images 102 (step S830). The learning feature quantity generator 150 generates learning feature quantities at the learning feature points (step S840).

The learning correlation feature quantity generator 160 generates correlation values between the N model feature quantities stored in the model feature quantity storage unit 130 and the learning feature quantities at the learning feature points in each of the learning images 102, and sets the highest correlation values as learning correlation feature quantities (step S850).

The recognizer generator 170 performs statistical learning in accordance with the learning correlation feature quantities, stores model feature quantities selected in the process of statistical learning into the selected feature quantity storage unit 310, and stores a recognizer into the recognizer storage unit 320 (step S860).

Figure 9:
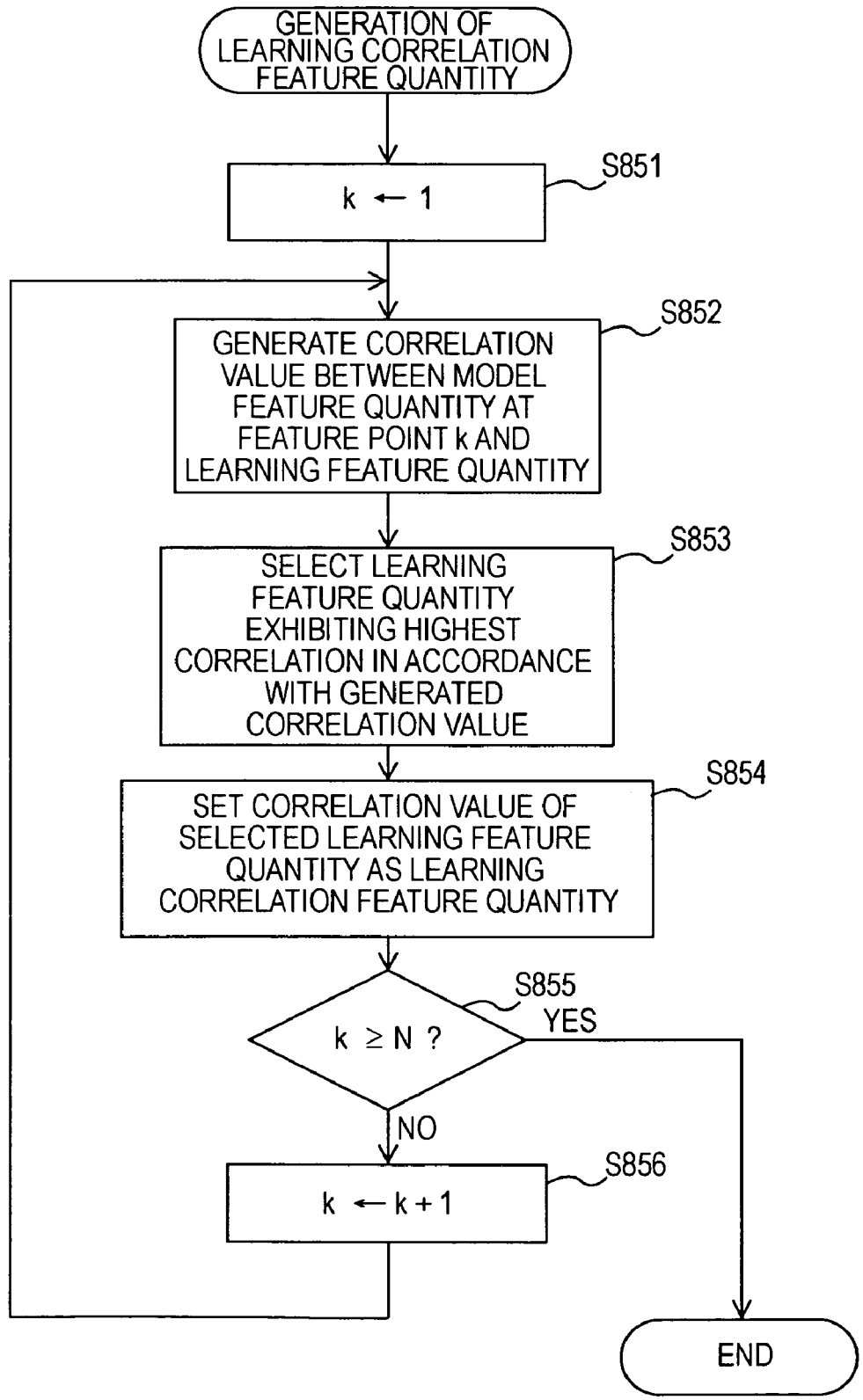
FIG. 9 is a flowchart showing an example of the process of generation of a learning correlation feature quantity in the embodiment.

FIG. 9 is a flowchart showing the process of generation of a learning correlation feature quantity (step S850) in this embodiment. In order to perform processing for each of the N feature points, k representing a feature point is initialized to "1" (step S851).

As processing on each feature point k, the correlation value between a model feature quantity at the feature point k of the model image 101 and a learning feature quantity at a corresponding point in the learning image 102 is generated (step S852). A learning feature quantity exhibiting the highest correlation is selected from among the correlation values generated for the feature point k (step S853). The correlation value of the selected learning feature quantity is set as a learning correlation feature quantity (step S854).

Until k, which indicates 1 in the initial stage, reaches N (step S855), the processing for each of the feature points k is repeated while incrementing 1 (step S856).

Figure 10:
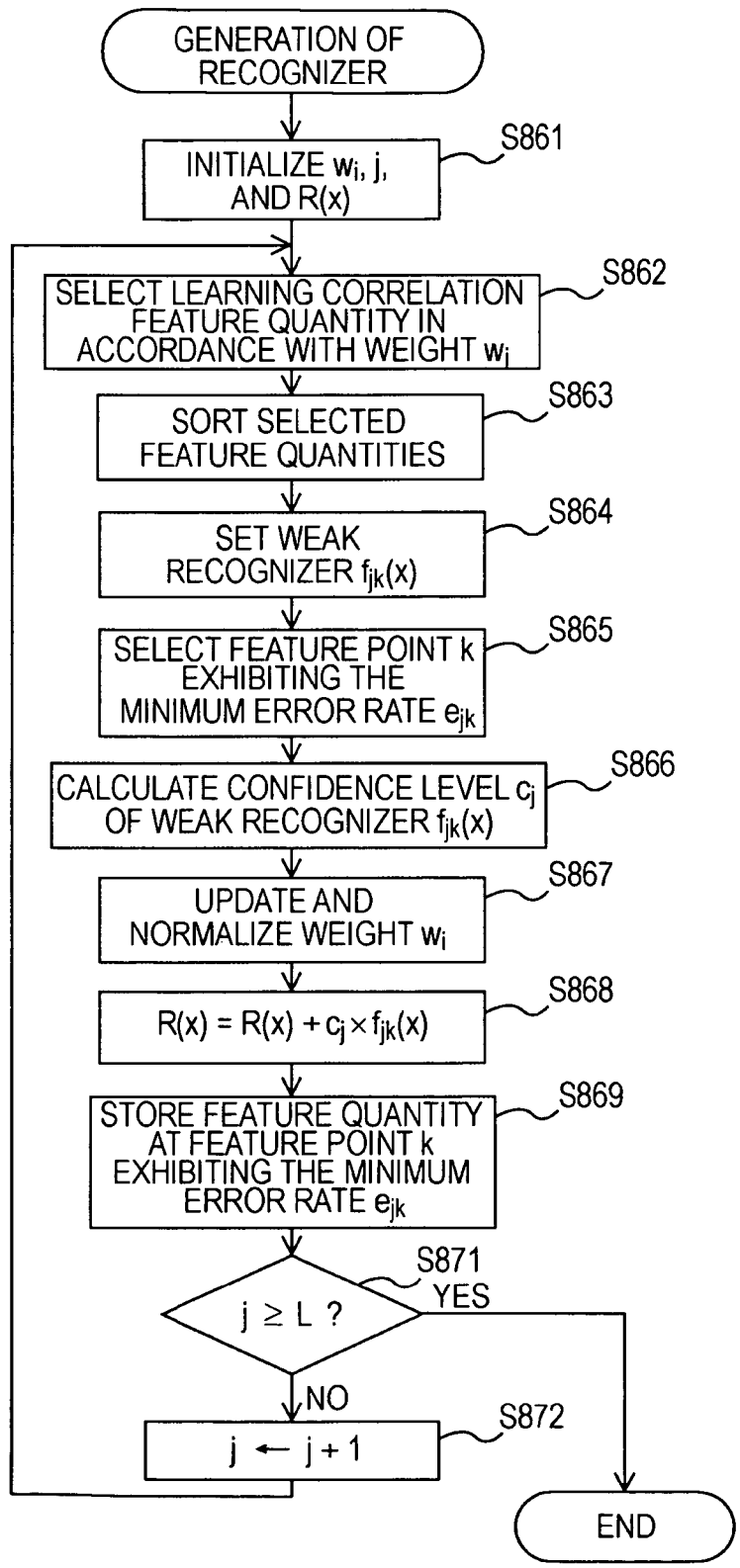
FIG. 10 is a flowchart showing an example of the process of generation of a recognizer in the embodiment.

FIG. 10 is a flowchart showing an example of the process of generation of a recognizer (step S860) in this embodiment. All the weights $w_i$ for M learning images 102 ($PI_i$) are normalized into "1/M", a counter j that counts the number of each of L weak recognizers $f_{jk}(x)$ is initialized to "1", and a recognizer $R(x)$ is initialized to "0" (step S861).

As processing for the jth weak recognizer $f_{jk}(x)$, M learning correlation feature quantities are selected in accordance with the weight $w_i$ for each feature point k (step S862). The selected learning correlation feature quantities are sorted in the ascending (or descending) order within a group $Gr_k$, as described with reference to FIG. 6 (step S863).

As described with reference to FIG. 7, for the learning correlation feature quantities sorted as described above, a threshold value $th_{jk}$ that achieves the minimum error rate $e_{jk}$ is set, and a weak recognizer $f_{jk}(x)$ that satisfies the threshold value $th_{jk}$ is set (step S864). The presence/absence information 103 is referred to when calculation of the error rate $e_{jk}$ is performed. A feature point k exhibiting the minimum error rate $e_{jk}$ is selected (step S865). The confidence level $c_j$ of the weak recognizer $f_{jk}(x)$ is calculated in accordance with the error rate $e_{jk}$ (step S866). The weight $w_i$ of the learning image 102 is updated in accordance with the confidence level $c_j$ acquired as described above, and each weight is normalized such that the sum of the weights $w_i$ is 1 (step S867).

The recognizer $R(x)$ is updated in accordance with the weak recognizer $f_{jk}(x)$ and the confidence level $c_j$, and the updated recognizer $R(x)$ is stored in the recognizer storage unit 320 (step S868). A model feature quantity at the feature point k exhibiting the minimum error rate $e_{jk}$ is selected, and the selected model feature quantity is stored in the selected feature quantity storage unit 310 (step S869).

Until the counter j, which indicates 1 in the initial stage, reaches L (step S871), processing for the jth weak recognizer $f_{jk}(x)$ is repeated while incrementing "1" (step S872).

Figure 11:
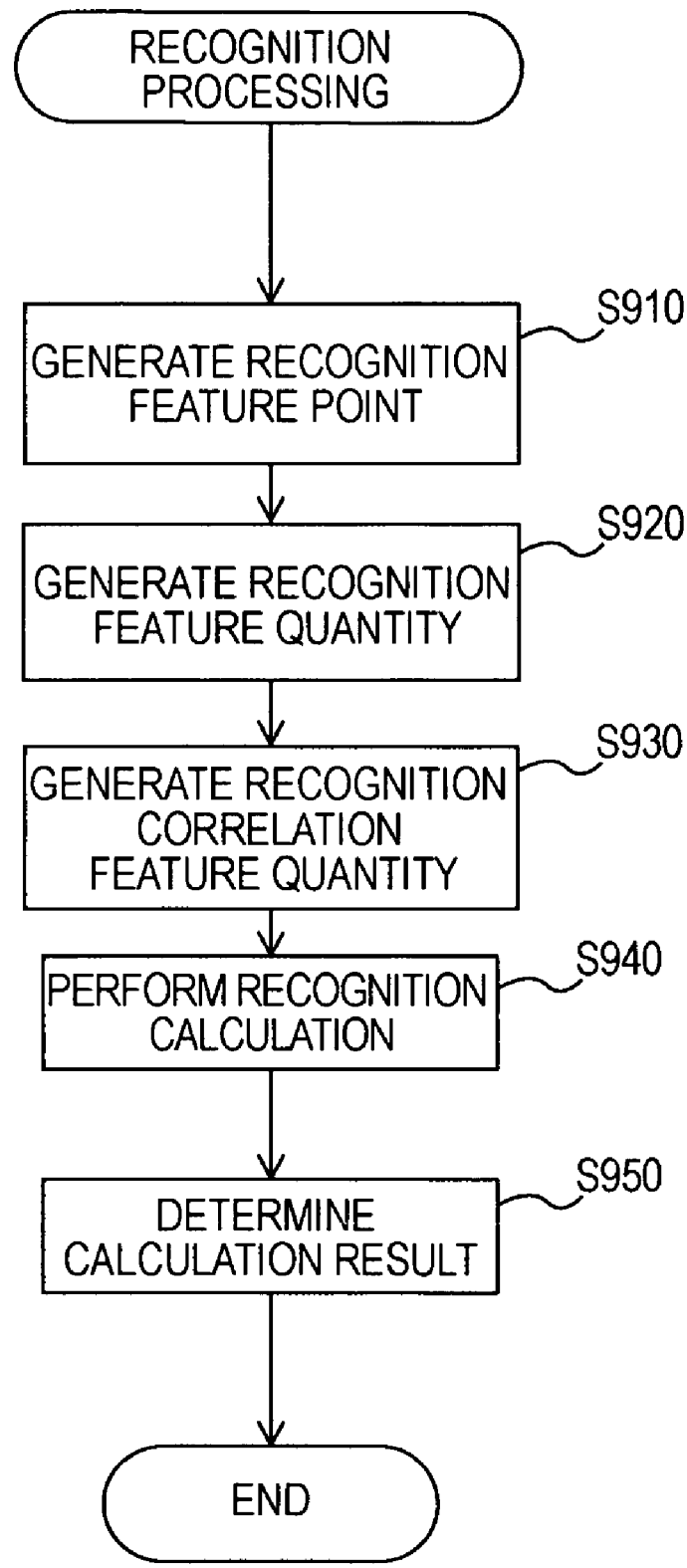
FIG. 11 is a flowchart showing an example of the process of recognition processing in a recognition phase in the embodiment.

FIG. 11 is a flowchart showing an example of the process of recognition processing in the recognition phase in this embodiment. The recognition feature point generator 240 generates recognition feature points in each of the recognition images 202 (step S910). The recognition feature quantity generator 250 generates recognition feature quantities at the recognition feature points (step S920).

The recognition correlation feature quantity generator 260 generates correlation values of the model feature quantities stored in the selected feature quantity storage unit 310 and the recognition feature quantities at the recognition feature points in each of the recognition images 202, and the highest correlation values are set as recognition correlation feature quantities (step S930).

The recognition processor 270 substitutes the recognition correlation feature quantities generated as described above into the recognizer stored in the recognizer storage unit 320 (step S940). As a result, the recognition result 279 indicating whether or not a recognition image includes a recognition target is output (step S950). That is, the recognizer R(x) representing a positive number indicates that a recognition target is included, and the recognizer R(x) representing a negative number indicates that a recognition target is not included.

As described above, according to this embodiment, learning of a recognizer is performed using learning correlation feature quantities generated by the learning correlation feature quantity generator 160, and recognition processing is performed using recognition correlation feature quantities generated by the recognition correlation feature quantity generator 260. Thus, presence or absence of a recognition target can be determined by comparing feature quantities of different types under the same scale. That is, various feature quantities can be appropriately used when object recognition is performed. Thus, a type of feature quantity suitable for recognition can be automatically selected and used from among various types of feature quantity prepared in advance. In addition, a feature quantity suitable for recognition can be automatically selected and used from among various feature quantities prepared in advance. In addition, statistical learning of a feature point suitable for recognition can be automatically performed.

Although an application example of the "discrete AdaBoost algorithm" has been described as an example of the boosting algorithm in the foregoing embodiment, other boosting algorithms may be adopted. For example, a "gentle AdaBoost algorithm" may be used. According to the "gentle AdaBoost algorithm", each weak recognizer outputs a continuous variate including a confidence level. Thus, corresponding weighting is performed, and calculation of a confidence level can be omitted.

The embodiments of the present invention are merely examples for embodying the present invention. As described below, there is a correspondence between the embodiments and the features of the claims. However, the present invention is not limited to this. Various changes can be made to the present invention without departing from the spirit and scope of the present invention.

That is, according to an embodiment of the present invention, a learning device corresponds to, for example, the learning device 100. A recognition device corresponds to, for example, the recognition device 200. A model feature point generator corresponds to, for example, the model feature point generator 110. A model feature quantity generator corresponds to, for example, the model feature quantity generator 120. A learning feature point generator corresponds to, for example, the learning feature point generator 140. A learning feature quantity generator corresponds to, for example, the learning feature quantity generator 150. A learning correlation feature quantity generator corresponds to, for example, the learning correlation feature quantity generator 160. A recognizer generator corresponds to, for example, the recognizer generator 170. A recognition feature point generator corresponds to, for example, the recognition feature point generator 240. A recognition feature quantity generator corresponds to, for example, the recognition feature quantity generator 250. A recognition correlation feature quantity generator corresponds to, for example, the recognition correlation feature quantity generator 260. A recognition processor corresponds to, for example, the recognition processor 270.

In addition, according to an embodiment of the present invention, processing for generating a plurality of feature points as model feature points from a model image including a recognition target corresponds to, for example, the processing of step S810. Processing for generating feature quantities as model feature quantities at the model feature points corresponds to, for example, the processing of step S820. Processing for generating a plurality of feature points as learning feature points from a learning image that includes a recognition target or that does not include a recognition target corresponds to, for example, the processing of step S830. Processing for generating feature quantities as learning feature quantities at the learning feature points corresponds to, for example, the processing of step S840. Processing for selecting a learning feature quantity that exhibits the highest correlation with respect to each of the model feature quantities and for generating the level of correlation with respect to the selected learning feature quantity as a learning correlation feature quantity corresponds to, for example, the processing of step S850. Processing for generating a recognizer in accordance with the learning correlation feature quantity and presence/absence information indicating whether or not the learning image includes the recognition target corresponds to, for example, the processing of step S860.

Processing steps described in an embodiment of the present invention may be regarded as a method including the series of processing steps or may be regarded as a program for causing a computer to execute the series of processing steps or a recording medium on which the program is stored.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing system comprising:
a learning device that generates, in advance, a recognizer for recognizing a recognition target; and
a recognition device that recognizes, using the recognizer, whether or not a recognition image includes the recognition target,
wherein the learning device includes
model feature point generating means for generating a plurality of feature points as model feature points from a model image including the recognition target, model feature quantity generating means for generating feature quantities as model feature quantities at the model feature points, learning feature point generating means for generating a plurality of feature points as learning feature points from a learning image that includes the recognition target or that does not include the recognition target, learning feature quantity generating means for generating feature quantities as learning feature quantities at the learning feature points, learning correlation feature quantity generating means for selecting a learning feature quantity that exhibits the highest correlation with respect to each of the model feature quantities and for generating the level of correlation with respect to the selected learning feature quantity as a learning correlation feature quantity, and recognizer generating means for generating the recognizer in accordance with the learning correlation feature quantity and presence/absence information indicating whether or not the learning image includes the recognition target, and wherein the recognition device includes recognition feature point generating means for generating a plurality of feature points as recognition feature points from the recognition image, recognition feature quantity generating means for generating feature quantities as recognition feature quantities at the recognition feature points, recognition correlation feature quantity generating means for selecting a recognition feature quantity that exhibits the highest correlation with respect to each of the model feature quantities and for generating the level of correlation with respect to the selected recognition feature quantity as a recognition correlation feature quantity, and recognition processing means for determining whether or not the recognition image includes the recognition target by substituting the recognition correlation feature quantity into the recognizer.

2. A learning device comprising:

model feature point generating means for generating a plurality of feature points as model feature points from a model image including a recognition target;

model feature quantity generating means for generating feature quantities as model feature quantities at the model feature points;

learning feature point generating means for generating a plurality of feature points as learning feature points from a learning image that includes the recognition target or that does not include the recognition target;

learning feature quantity generating means for generating feature quantities as learning feature quantities at the learning feature points;

learning correlation feature quantity generating means for selecting a learning feature quantity that exhibits the highest correlation with respect to each of the model feature quantities and for generating the level of correlation with respect to the selected learning feature quantity as a learning correlation feature quantity; and recognizer generating means for generating a recognizer in accordance with the learning correlation feature quantity and presence/absence information indicating whether or not the learning image includes the recognition target.

3. The learning device according to claim 2, wherein the model feature points and the learning feature points are selected in accordance with types of feature quantities at the corresponding feature points.

4. The learning device according to claim 3, wherein the model feature points and the learning feature points correspond to corners.

5. The learning device according to claim 3, wherein the model feature points and the learning feature points exist within a region in the recognition target.

6. The learning device according to claim 2, wherein the model feature quantities and the learning feature quantities are selected in accordance with types of feature quantities.

7. The learning device according to claim 6, wherein the model feature quantities and the learning feature quantities are acquired by second-order differentiation at the model feature points and the learning feature points.

8. The learning device according to claim 6, wherein the model feature quantities and the learning feature quantities are acquired in accordance with distribution of color at the model feature points and the learning feature points.

9. The learning device according to claim 2, wherein the recognizer generating means provides a threshold value for the learning correlation feature quantity to perform screening of the learning correlation feature quantity on the basis of the threshold value.

10. The learning device according to claim 9, wherein the recognizer generating means generates the recognizer and performs screening of the learning correlation feature quantity in accordance with a boosting algorithm.

11. A recognition device comprising:

recognition feature point generating means for generating a plurality of feature points as recognition feature points from an input recognition image;

recognition feature quantity generating means for generating feature quantities as recognition feature quantities at the recognition feature points;

recognition correlation feature quantity generating means for selecting a recognition feature quantity that exhibits the highest correlation with respect to each of model feature quantities at model feature points generated from a model image including a recognition target and for generating the level of correlation with respect to the selected recognition feature quantity as a recognition correlation feature quantity; and recognition processing means for determining whether or not the recognition image includes the recognition target by substituting the recognition correlation feature quantity into a recognizer generated in accordance with presence/absence information indicating whether or not a learning image that includes the recognition target or that does not include the recognition target includes the recognition target and a learning correlation feature quantity indicating the level of correlation between each of the model feature quantities and a learning feature quantity that exhibits the highest correlation with respect to the corresponding model feature quantity.

12. A learning method, performed on one or more processors of a learning device, comprising the steps of:

generating a plurality of feature points as model feature points from a model image including a recognition target;

generating feature quantities as model feature quantities at the model feature points;

generating a plurality of feature points as learning feature points from a learning image that includes the recognition target or that does not include the recognition target;

generating feature quantities as learning feature quantities at the learning feature points;

selecting a learning feature quantity that exhibits the highest correlation with respect to each of the model feature quantities and generating the level of correlation with respect to the selected learning feature quantity as a learning correlation feature quantity; and generating a recognizer in accordance with the learning correlation feature quantity and presence/absence information indicating whether or not the learning image includes the recognition target.

13. A computer-readable non-transitory storage medium comprising programmable instructions configured to perform a method comprising the steps of:

generating a plurality of feature points as model feature points from a model image including a recognition target;

generating feature quantities as model feature quantities at the model feature points;

generating a plurality of feature points as learning feature points from a learning image that includes the recognition target or that does not include the recognition target;

generating feature quantities as learning feature quantities at the learning feature points;

selecting a learning feature quantity that exhibits the highest correlation with respect to each of the model feature quantities and generating the level of correlation with respect to the selected learning feature quantity as a learning correlation feature quantity; and generating a recognizer in accordance with the learning correlation feature quantity and presence/absence information indicating whether or not the learning image includes the recognition target.

14. A learning device comprising:

a model feature point generator that generates a plurality of feature points as model feature points from a model image including a recognition target;

a model feature quantity generator that generates feature quantities as model feature quantities at the model feature points;

a learning feature point generator that generates a plurality of feature points as learning feature points from a learning image including the recognition target or not including the recognition target;

a learning feature quantity generator that generates feature quantities as learning feature quantities at the learning feature points;

a learning correlation feature quantity generator that selects a learning feature quantity exhibiting the highest correlation with respect to each of the model feature quantities and that generates the level of correlation with respect to the selected learning feature quantity as a learning correlation feature quantity; and a recognizer generator that generates a recognizer in accordance with the learning correlation feature quantity and presence/absence information indicating whether or not the learning image includes the recognition target.

15. A recognition device comprising:

a recognition feature point generator that generates a plurality of feature points as recognition feature points from an input recognition image;

a recognition feature quantity generator that generates feature quantities as recognition feature quantities at the recognition feature points;

a recognition correlation feature quantity generator that selects a recognition feature quantity exhibiting the highest correlation with respect to each of model feature quantities at model feature points generated from a model image including a recognition target and that generates the level of correlation with respect to the selected recognition feature quantity as a recognition correlation feature quantity; and a recognition processor that determines whether or not the recognition image includes the recognition target by substituting the recognition correlation feature quantity into a recognizer generated in accordance with presence/absence information indicating whether or not a learning image including the recognition target or not including the recognition target includes the recognition target and a learning correlation feature quantity indicating the level of correlation between each of the model feature quantities and a learning feature quantity exhibiting the highest correlation with respect to the corresponding model feature quantity.

* * * * *